United States Patent [19]

Gemmell et al.

[11] Patent Number: 5,384,353

[45] Date of Patent: Jan. 24, 1995

[54] GLASS REINFORCED PC/ABS BLEND WITH TOUGHNESS

[75] Inventors: Linda M. Gemmell, Belpre, Ohio; Otho W. Tennant, Washington, W. Va.; Robert R. Gallucci, Mt. Vernon, Ind.

[73] Assignee: General Electric Company, Pittsfield, Mass.

[21] Appl. No.: 60,896

[22] Filed: May 12, 1993

[51] Int. Cl.$^6$ ............................................... C08K 3/40
[52] U.S. Cl. ..................... 524/494; 524/487; 524/489; 524/504
[58] Field of Search ................ 524/504, 494, 487, 489

[56] References Cited

U.S. PATENT DOCUMENTS

| | | |
|---|---|---|
| 3,488,317 | 1/1970 | Hechelhammer et al. |
| 3,678,079 | 7/1972 | Carty et al. |
| 4,205,141 | 5/1980 | Liebig et al. ............................ 525/67 |
| 4,430,476 | 2/1984 | Liu |
| 4,482,672 | 11/1984 | Neuray et al. |
| 4,487,881 | 12/1984 | Rawlings et al. .................... 524/504 |
| 4,503,183 | 3/1985 | Liu ......................................... 524/504 |
| 4,547,533 | 10/1985 | Zabrocki et al. |
| 4,624,987 | 11/1986 | Hosoi et al. |
| 4,983,663 | 1/1991 | Orikasa et al. ........................ 524/504 |
| 5,106,904 | 4/1992 | Fontana et al. |

FOREIGN PATENT DOCUMENTS

| | | |
|---|---|---|
| 64692 | 11/1982 | European Pat. Off. |
| 345652 | 12/1989 | European Pat. Off. |
| 440442 | 8/1991 | European Pat. Off. |
| 2305846 | 12/1990 | Japan |

OTHER PUBLICATIONS

Owens–Corning Fiberglas Corporation material data sheets. no date.

*Primary Examiner*—Edward Cain

[57] ABSTRACT

A thermoplastic resin composition is provided comprising an aromatic polycarbonate resin, rubber modified vinyl aromatic-vinyl cyanide graft copolymer, and glass fibers which have been treated with polyolefin wax and optionally a functionalized silane. The nature of the coating on the glass fibers provides the composition with improved impact strength over binding glass. The composition is useful as molding material.

20 Claims, No Drawings

GLASS REINFORCED PC/ABS BLEND WITH TOUGHNESS

BACKGROUND OF THE INVENTION

1. Field of the Invention

The present invention is directed to glass reinforced blend of aromatic polycarbonate resin and acrylonitrile-butadiene-styrene graft copolymers which contain uniformly dispersed therein finely divided fibrous glass which contains a particular coating agent thereon, and more particularly relates to such compositions wherein the coating agent comprise a polyolefin wax and with a optionally functionalized silane binding agent.

2. Description of the Related Art

Fibrous glass, when incorporated with a thermoplastic polymer, beneficially aids the mechanical properties of the polymer which results in greater application thereof. In the manufacture of the fibrous glass, filaments are first formed through the use of various processes. The filaments are then gathered into a bundle known as a strand. In order to bind the filaments into a strand so that the strand can be handled, a binder or binding agent is applied to the glass filaments. Subsequently, the strand can be chopped into various lengths as desired. These are called chopped strands. Some of these binding agents are polymers such as polyvinyl acetate, particular polyester resins, starch, acrylic resins, melamine, polyvinyl chloride, polyethylene oxide, polyurethane, polyepoxide, or polyvinyl alcohol. In the particular area of thermoplastic aromatic polycarbonate resins, the fibrous glass enhances some of the mechanical properties of the polycarbonate resin. Unfortunately, in such polycarbonate resin compositions, the addition of such glasses can substantially lower the room temperature Notched Izod impact strengths of the fiber reinforced compositions, and it can also substantially reduce the biaxial impact (instrument impact) energies of such compositions. Glass fibers employing a non-bonding olefinic sizing agent which does not chemically bond with the polycarbonate resin have been previously employed in fiber reinforced polycarbonate resin compositions and have resulted in improved notched Izod impact strengths thereof compared to other glass filled polycarbonate compositions. Utilization of such glasses in blends of polycarbonate with other resins would not be expected to show such improvements due to the likelihood of the glass bonding with the non-polycarbonate resinous components of the blend compositions.

Polymer blends containing an aromatic polycarbonate resin, and rubber modified graft copolymer, such as a acrylonitrile-butadiene styrene (ABS) graft copolymer, a styrene acrylonitrile copolymer (SAN) and glass fiber reinforcements have in the past typically shown greater likelihoods of brittle failure and substantial decreases in properties such as notched Izod impact strength and biaxial impact strength compared to non-glass filled blends of such materials.

Accordingly, there is a need to provide glass reinforced polycarbonate/acrylonitrile-butadiene-styrene graft copolymer blends exhibiting enhanced properties such as Izod impact strength, biaxial impact energy, ductility, tensile and flexural properties compared to blends containing common glass reinforcement grades.

SUMMARY OF THE INVENTION

Thermoplastic resin compositions are provided containing (a) an aromatic polycarbonate resin, (b) a rubber modified graft copolymer and (c) glass fibers which have been treated with a coating agent comprising a (i) polyolefin wax and optionally (ii) a bonding agent comprising a functionalized silane. The thermoplastic resin compositions are useful as injection molding, extrusion and blow molding resins, and exhibit improved properties such as increased notched Izod impact strength, increased biaxial impact energy at maximum load, and increased ductility.

DETAILED DESCRIPTION OF THE INVENTION

The rubber modified graft copolymer which is included in the compositions of the invention comprises a rubber substrate and a grafted vinyl aromatic/vinyl cyanide polymeric portion grafted to the rubber substrate.

Rubbers suitable as rubber substrates for the preparation of the rubber modified graft copolymers include in particular polybutadiene, butadiene/styrene copolymers, butadiene/acrylonitrile copolymers, polyisoprene, EPM rubbers (ethylene/propylene rubbers), EPDM rubbers (ethylene/propylene/diene rubbers containing, as diene, a nonconjugated diene such as hexadiene-(1,5) or norbornadiene in small quantities) and alkylacrylate rubbers based on $C_1$-$C_8$alkyacrylates, in particular ethyl, butyl and ethylhexylacrylate.

The alkylacrylate rubbers may contain up to 30% by weight (based on the weight of rubber) of monomers such as vinyl acetate, acrylonitrile, styrene, methylmethacrylate and/or vinyl ether as copolymer components. The alkylacrylate rubbers may also contain minor quantities, preferably up to 5% by weight (based on the weight of rubber) of ethylenically unsaturated monomers which have a cross-linking action. Examples of such crosslinking agents include alkylenediol-diacrylates and methacrylates, polyester-diacrylates and methacrylates, divinylbenzene, trivinylbenzene, triallylcyanurate, allylacrylate, alkylmethacrylates, butadiene and isoprene. Acrylate rubbers used as graft basis may also be core-shell products containing, as core, a crosslinked diene rubber of one or more conjugated dienes such as polybutadiene or a copolymer of conjugated diene with an ethylenically unsaturated monomer such as styrene and/or acrylonitrile.

Diene rubbers and alkyl acrylate rubbers are preferred rubbers for the preparation of the graft polymers.

The rubbers are preferably present in the graft polymers in the form of at least partially cross-linked particles having an average particle diameter of from 0.05 to 20.0 micrometer, preferably from 0.1 to 2.0 micrometer and most preferably from 0.1 to 0.8 micrometer. The term particle diameter used in this context denotes the average particle diameter $d_{50}$ determined by ultracentrifuge measurements according to W. Scholtan et al, Kolloid-Z, u-Z. Polymere 250 (1972), 782–796.

Although the graft copolymer may include the rubber substrate and the grafted portion in any ratio which is desired, it is preferred that the graft copolymer comprises at least 10 weight percent of the rubber substrate, and more preferably at least 40 weight percent of the rubber substrate based on the total weight of the graft copolymer.

The grafted polymeric portion of the graft copolymer is preferably formed from at least one vinyl aromatic monomer and at least one vinyl cyanide monomer. The at least one vinyl aromatic monomer may comprise unsubstituted styrene monomer, substituted styrene monomer, or mixtures thereof. Substituted styrene monomers may include substituents on the aromatic portion and/or the vinyl portion, with preferred substituents being selected from the group consisting of alkyl groups of from 1 to 5 carbon atoms and halogen atoms such as chlorine and bromine. Preferred vinyl aromatic monomers include unsubstituted styrene, alphamethylstyrene, dibromostyrene and mixtures thereof. The at least one vinyl cyanide monomer which is employed in forming the grafted portion is preferably selected from the group consisting of acrylonitrile and methacrylonitrile. In a preferred embodiment, the grafted portion is formed from a styrene monomer and acrylonitrile, with the styrene and acrylonitrile being employed in a weight ratio of at least about 1:1, and more preferably, at least 3:1.

The graft copolymer may be formed by any of the methods well known in the art for the formation of ABS graft copolymers. For example, the graft copolymer may be formed by emulsion polymerization wherein the at least one styrene monomer and the at least one additional monomer are polymerized in the presence of the rubber substrate. As is well known in the art, such a process often results in the formation of the grafted copolymer and a non-grafted copolymer of the at least one vinyl aromatic monomer and the at least one vinyl cyanide monomer, which non-grafted copolymer does not contain the rubber substrate.

The graft polymers are prepared by radical graft polymerization of the vinyl aromatic and vinyl cyanide monomers in the presence of the rubbers which are to be grafted.

The preferred methods of preparation of the graft polymers are emulsion, bulk, solution, solvent-free and suspension polymerisation and combinations of these methods carried out in known manner. ABS polymers are particularly preferred graft polymers.

Polycarbonate resins, suitable for use in this invention, can comprise non-aromatic as well as aromatic forms. With respect to aromatic polycarbonate resins, these can be made by those skilled in this art or can be obtained from a variety of commercial sources. They may be prepared by reacting a dihydric phenol with a carbonate precursor, such as phosgene, a haloformate or a carbonate ester. Typically, they will have recurring structural units of the formula:

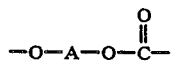

wherein A is a divalent aromatic radical of the dihydric phenol employed in the polymer producing reaction. Preferably, the aromatic carbonate polymers have an intrinsic viscosity ranging from 0.30 to 1.0 dl/g (measured in methylene chloride at 25° C.). By dihydric phenols is meant mononuclear or polynuclear aromatic compounds containing two hydroxy radicals, each of which is attached to a carbon atom of an aromatic nucleus. Typically, dihydric phenols include 2,2-bis-(4-hydroxyphenyl)propane; 2,2-bis-(3,5-dimethyl-4-hydroxyphenyl)propane; 4,4'-dihydroxydiphenyl ether; bis(2-hydroxyphenyl)methane, mixtures thereof and the like. The preferred aromatic carbonate polymer for component (ii) is a homopolymer derived from 2,2-bis(4-hydroxyphenyl)propane(bisphenol-A).

Poly(ester carbonates) for use in the invention are known and can be obtained commercially. Generally, they are copolyesters comprising recurring carbonate groups

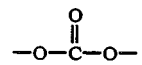

carboxylate groups

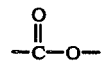

and aromatic carbocyclic groups in the linear polymer chain, in which at least some of the carboxylate groups and at least some of the carbonate groups are bonded directly to ring carbon atoms of the aromatic carbocyclic groups. These poly(ester carbonates) in general, are prepared by reacting a difunctional carboxylic acid, such as phthalic acid, isophthalic acid, terephthalic acid, homophthalic acid, o-, m-, and p-phenylenediacetic acid, the polynuclear aromatic acids, such as diphenic acid, 1,4-naphthalic acid, mixtures of any of the foregoing, and the like, with a dihydric phenol and a carbonate precursor, of the types described above. A particularly useful poly(ester carbonate) is derived from bisphenol-A, isophthalic acid, terephthalic acid, or a mixture of isophthalic acid and terephthalic acid, or the reactive derivatives of these acids such as terephthaloyl dichloride, or a mixture thereof, and phosgene. The molar proportions of dihydroxy diaryl units to dicarboxylic acid can range, for example, from 0.30–0.80:0.-70–0.20 and the molar range of terephthalate units to isophthalate units can range from 9:1 to 2:8 in this preferred family of resins.

The instant invention is directed to fibrous glass reinforced thermoplastic resin compositions containing an aromatic carbonate resin, and a rubber modified graft copolymer wherein glass fibers are uniformly dispersed therein. The particular glass fibers employed herein are those that have been treated with a coating agent comprising (i) a polyolefin wax and optionally (ii) a functionalized silane binding agent.

These polyolefin waxes preferably comprise polyethylene wax or polypropylene wax or copolymers thereof such as polyethylene-propylene wax and polyethylene-butylene. A particularly suitable polyolefinic wax is polyethylene wax. These polyolefin waxes are well known to those skilled in the art and are available commercially. The polyolefin waxes are preferably based on olefin having from 2 to 18 carbon atoms, more preferably from 2 to 6 carbon atoms, and most preferably from 2 to 3 carbon atoms.

The functionalized silanes, such as alkoxy silanes, are preferably selected from the group of aminopropyl triethoxy silane, glycidyl propyl trimethoxy silane, (3,4-epoxycyclohexyl)ethyl triethoxy silane, mercaptopropyl alkoxy silane, aminoethyl aminopropyl alkoxy silane and ureidoalkyl triethoxy silanes. Particularly useful are aminopropyl triethoxy silane and glycidyl-propyl triethoxy silane. Preferred functionality of the functionalized silane is epoxy functionality and/or amine functionality.

The coating agent may be in the form of separate molecules of polyolefinic wax and functionalized silane or may be in the form of a copolymer such as of an alkylene-alkoxy silane block copolymer comprising from about 50–95 weight percent of the residue of an alkylene having from 2 to 18 carbon atoms and correspondingly 5–50 weight percent of the residue of functionalized alkoxy silane in the copolymer based on the total weight of the copolymer.

Other materials can also be employed with the coating agent so used in this invention and include such materials as antistatic agents, coupling agents, wetting agents, etc. In addition, other ingredients may be employed with the thermoplastic compositions such as pigments and fillers. The critical element is that the coating agent be non-bonding to both the polycarbonate resin and the graft copolymer.

The coating agent preferably comprises at least 50 percent by weight polyolefin wax based on the total weight of the coating agent, for example 50 to 100 percent by weight thereof, preferably from 70 to 95 percent by weight thereof, and most preferably from 75 to 90 percent by weight thereof, and optional further comprises from 1 to 50 percent by weight functionalized silane based on the total weight of the coating agent, preferably from 5 to 30 percent by weight thereof, and more preferably from 10 to 25 percent by weight thereof.

The glass fibers that are employed in the practice of this invention are preferably glass strands which have been treated with a coating agent comprising a polyolefin wax and optionally a functionalized silane.

In preparing the glass fibers, a number of filaments can be formed simultaneously, treated with the coating agent and then bundled into what is called a strand. Alternatively the strand itself may be first formed of filaments and then treated with a coating agent. The amount of the coating agent employed is generally that amount which is sufficient to bind the glass filaments into a continuous strand. Generally, this may be about 1.0 weight percent based on the weight of the glass filament. As employed, the glass fibers if in the form of chopped glass strands may be one-fourth inch long or less and are preferably one-eighth inch long. They may also be longer than one-fourth inch in length if desired.

In the practice of this invention, the coated glass fibers, preferably coated, chopped glass strands, may be first blended with the aromatic polycarbonate resin and rubber modified graft polymer and then fed to an extruder and the extrudate cut into pellets, or they may be separately fed to the feed hopper of an extruder. Generally, in the practice of this invention for preparing pellets of the composition set forth herein, the extruder is maintained at a temperature of approximately 525° F. to 600° F. The pellets so prepared when cutting the extrudate may be one-fourth inch long or less. As stated previously, such pellets contain finely divided uniformly dispersed glass fibers in the blend composition comprising aromatic carbonate polymer and graft copolymer. The dispersed glass fibers are preferably about 0.001 to about 0.10 inch long as a result of the shearing action on the chopped glass strands in the extruder barrel. In addition, the amount of glass present in the composition can range anywhere from about 5 to about 50 weight percent based on the total weight of the thermoplastic blend composition, preferably from 10 to 20 percent by weight thereof.

The injection molding pellets so prepared as disclosed in the above paragraph are pellets having uniformly distributed throughout fibrous glass filaments of the size indicated above, namely 0.001 to about 0.10 inches long.

The filamentous glass to be coated with the coating agent in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively sodium free. This is known as "E" glass. However, other glass compositions are useful in the practice of the present invention, and all such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 3–20 microns, but this is not critical to the present invention. It is known, however, to those skilled in the art, that smaller filament diameters will also increase the strength of plastics treated therewith.

The length of the glass filaments and whether or not they are bundled into fibers and the fibers bundled in turn to yarns, ropes or rovings, or woven into mats, and the like are also not critical to the invention. However, in preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur.

The composition of this invention finds utility in preparing or forming articles by injection molding, extrusion, compression molding extrusion or blow molding wherein the articles have greatly increased strength by employing the fibrous glass so described herein.

It will thus be seen that the objects set forth above, among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

The thermoplastic resin compositions of the present invention comprise an aromatic polycarbonate resin, a rubber modified graft copolymer, and coated glass fibers. Preferably the thermoplastic resin composition comprises an aromatic polycarbonate resin present at a level of from 10 to 80 percent by weight based on the total weight of the material, and a rubber modified vinyl aromatic graft copolymer resin present at a level of from 10 to 80 percent by weight based on the total weight of the thermoplastic resin composition, and more preferably the aromatic polycarbonate resin is present at a level of from 40 to 75 percent by weight based on the total weight of the composition, and most preferably present at a level of from 50 to 70 percent by weight based on the total weight of the composition. Preferably the rubber modified graft copolymer resin is present at a level of from 20 to 50 percent by weight based on the total weight of the thermoplastic resin composition, and more preferably is present at a level of from 25 to 40 percent by weight based on the total weight of the composition. Preferably the glass fibers are present at a level of from 5 to 50 percent by weight based on the total weight of the composition, and more preferably present at a level of from 10 to 20 percent by weight based on the total weight of the composition.

The amount of coating agent employed can generally be selected as desired. Typically, the amount ranges from about 0.1 to about 5 by weight, and more typically ranges from about 0.1 to 2% by weight, based on the weight of the glass fibers. The surface coating means can be selected among any known to those skilled in the art. The coating agent may be applied to the glass fibers by conventional means. In general, the fibers are coated by immersing the fibers in the coating agent or contacting the fibers with an aqueous emulsion, or suspension of the coating.

EXAMPLES

The following examples illustrate the present invention, but are not meant to be limitations to the scope thereof.

Polymer blends constituting polycarbonate, acrylonitrile-butadiene-styrene graft copolymer resin, styrene acrylonitrile copolymer and glass fiber reinforcements were prepared by melt mixing. The examples illustrating the present invention employed the addition of a polyolefin coated fiberglass and resulted in a filled product having improved impact strength and toughness compared to products using other glass fiber reinforcements. The experimental blends containing polycarbonate, acrylonitrile butadiene styrene graft copolymer, styrene acrylonitrile copolymer and various chopped strand glass fibers were melt compounded in a twin screw extruder at 500 rpm and stock temperature of approximately 630° F. to 670° F. Injection molding of test specimens was completed at 550° F. melt temperature. Tables I, II, III, IV, V, VI and VII show formulations of properties of glass fiber containing blends and glass free blends. The blends of the present invention exhibited improved impact strengths compared to blends using other reinforcing fibers. Improvements were seen in either Notched Izod, biaxial impact tests and/or ductility.

PC1: Polymer of Bisphenol A. 0.4% trimellitic trichloride and phosgene, I.V. of 0.581 dl/g measured in Chloroform @ 25° C.

PC2: Polymer of Bisphenol A and phosgene, I.V. of 0.535 dl/g in chloroform @ 25° C.

PC3: Polymer of Bisphenol A and phosgene, I.V. of 0.454 dl/g in chloroform @ 25° C.

PC4: Polymer of Bisphenol A and phosgene, I.V. of 0.471 dl/g in chloroform @ 25° C.

All fibers were composed of E glass and were about 14 microns in diameter.

GCA: Glass fibers treated with Binder: styrene-ethylacrylate copolymer, and Coupling agent: gamma aminopropyl triethoxysilane (GAP).

GCB: Glass fibers treated with Binder: Aliphatic polyurethane-polyester with bisphenol-A (BPA) based polyepoxide and aryl diamine, and Coupling agent: GAP.

GI1: Glass fibers treated with Binder: polyethylene wax, and Coupling agent: GAP.

GCC: Glass fibers treated with Binder: Aliphatic polyurethane-polyester, and Coupling agent: GAP.

GCD: Glass fibers treated with Binder: Aliphatic polyurethane-polyester with BPA polyepoxide (85:15). Coupling agent: GAP.

GI1 is a glass fiber of the present invention and had a coating agent which contained polyethylene wax and aminopropyl triethoxy silane.

Examples A–Z are comparative examples. Examples 1–8 illustrate the present invention.

The abbreviations in the tables mean the following: NI means Notched Izod ft-lbs/in. TS means tensile strength (psi), TE means tensile elongation (%), TM means tensile modulus (psi). FS means flexural strength. FM means flexural modulus. The amounts below are in parts per 100 parts by weight of thermoplastic resins (PC+SAN+ABS).

ASTM Test procedures were as follows:
D638 Tensile Strength, Modulus and Elongation.
D790 Flexural Modulus and Strength
D256 Notched Izod impact.
D3763 Instrumented (Biaxial) Impact
D1238 Melt Viscosity
D2857 Intrinsic Viscosity (I.V.).

Failures are classified visually from biaxial testing using a 0.5 inch diameter tup on a 3.0 inch span. Ductile failures exhibit a clean, stress-whitened, puncture of a test plaque without cracks radiating beyond 0.5 inch from the center. Brittle failures exhibit complete shattering of the test plaque, material punched out from the plaque, cracks extending beyond 1.5 inch from the center. Semi-ductile failures fall between these classifications and may show smooth, stress-whitened failures with some cracks up to 1.5 inch from the center.

TABLE 1

| | Evaluation of Glass Fibers in PC/ABS Blends | | | | | | |
|---|---|---|---|---|---|---|---|
| | A | B | C | 1 | 1' | D | E |
| PC1 | 64 | 64 | 64 | 64 | #1 | 64 | 64 |
| SAN1 | 20 | 20 | 20 | 20 | Re- | 20 | 20 |
| ABS1 | 16 | 16 | 16 | 16 | Mold | 16 | 16 |
| GLASS | | | | | | | |
| GCA | — | 11.2 | — | — | — | — | — |
| GCB | — | — | 11.2 | — | — | — | — |
| GI1 | — | — | — | 11.2 | — | — | — |
| GCC | — | — | — | — | — | 11.2 | — |
| GCD | — | — | — | — | — | — | 11.2 |
| NI Impact (0.125 inch) (ft-lb/in) | | | | | | | |
| 73° F. | 11.9 | 2.0 | 2.4 | 4.1 | 4.0 | 2.4 | 2.4 |
| −20° F. | 1.3 | 1.4 | 1.4 | 1.8 | 1.8 | 1.5 | 1.7 |
| TS (psi) | 8422 | 10410 | 10066 | 8494 | 8602 | 10312 | 11304 |
| TE % | 58 | 3 | 3 | 11 | 10 | 3 | 3 |
| TM E5(psi) | 3.3 | 5.2 | 5 | 5.3 | 5.3 | 5.8 | 5.8 |
| Biaxial Impact, (ft-lb) | | | | | | | |
| Energy @ Max Ld | 37.07 | 4.8 | 3.48 | 9.37 | 11.46 | 4.15 | 5.86 |
| Std Dev | 2.63 | 2.62 | 1.76 | 1.05 | 1.88 | 2.24 | 2.21 |

TABLE 1-continued

Evaluation of Glass Fibers in PC/ABS Blends

| | A | B | C | 1 | 1' | D | E |
|---|---|---|---|---|---|---|---|
| Total Energy | 39.65 | 12.73 | 13.83 | 19.28 | 20.19 | 14.29 | 13.91 |
| Duct./SemiDu/Brittle | 10/0/0 | 0/0/10 | 4/6/0 | 10/0/0 | 10/0/0 | 1/9/0 | 0/10/0 |

TABLE II

Evaluation of Glass Fibers in PC/ABS blends

| | F | G | 2 |
|---|---|---|---|
| PC1 | 64 | 64 | 64 |
| SAN1 | 10 | 10 | 10 |
| ABS1 | 26 | 26 | 26 |
| GLASS | | | |
| GCA | — | 11.2 | — |
| GI1 | — | — | 11.2 |
| NI Impact (0.125 in.), (ft-lb/in) | | | |
| 73° F. | 8.4 | 2.4 | 8.6 |
| −20° F. | 5.7 | 1.5 | 1.9 |
| TS psi | 7204 | 9176 | 7666 |
| TE % | 73 | 4 | 7 |
| TM E5 (psi) | 2.9 | 4.7 | 5.1 |
| Biaxial Impact, (ft-lb) | | | |
| Energy @ Max Ld | 28 | 4.86 | 10.68 |
| Std Dev | 1.5 | 1.82 | 0.99 |
| Total Energy | 30.19 | 15.43 | 17.9 |
| Duct./SemiDu/Brittle | 10/0/0 | 0/0/10 | 7/3/0 |

TABLE III

Evaluation of Glass Fibers in PC/ABS

| | H | I | J | 3 | 3' | K | L |
|---|---|---|---|---|---|---|---|
| PC2 | 64 | 64 | 64 | 64 | #3 | 64 | 64 |
| SAN2 | 18 | 18 | 18 | 18 | MOLD | 18 | 18 |
| ABS1 | 18 | 18 | 18 | 18 | REPEAT | 18 | 18 |
| GLASS | | | | | | | |
| GCB | — | 11.2 | — | — | — | — | — |
| GCA | — | — | 11.2 | — | — | — | — |
| GI1 | — | — | — | 11.2 | — | — | — |
| GCC | — | — | — | — | — | 11.2 | — |
| GCD | — | — | — | — | — | — | 11.2 |
| NI (0.125 in.) Impact (ft-lb/in) | | | | | | | |
| 73° F. | 11.4 | 3.4 | 2.4 | 4.6 | 4.8 | 2.6 | 3.1 |
| −20° F. | 8.5 | 2.3 | 1.6 | 2.4 | 2.4 | 1.7 | 1.9 |
| −40° | 8.3 | 2.4 | 1.6 | 2.0 | 2.0 | 1.6 | 2.4 |
| TS (psi) | 7802 | 9440 | 10086 | 8148 | 8120 | 10188 | 10742 |
| TM E5 (psi) | 2.8 | 4.26 | 5.06 | 5.42 | 5.4 | 5.37 | 5.16 |
| TE (%) | 173.4 | 4 | 3 | 9 | 8 | 3 | 4 |
| FS (psi) | 11545 | 13660 | 14590 | 12570 | 12630 | 14625 | 15825 |
| FM E5 (psi) | 3.1 | 4.1 | 4.8 | 4.9 | 5.0 | 4.9 | 4.9 |
| Biaxial, 72° F., (ft-lb) | | | | | | | |
| Energy at Max Load | 37.89 | 9.11 | 2.77 | 9.63 | 11.11 | 4.36 | 2.58 |
| S. Dev. | 2.85 | 2.29 | 0.24 | 1.89 | 0.89 | 0.73 | 0.13 |
| Total Energy | 38.78 | 20.12 | 14.77 | 20.17 | 19.92 | 16.93 | 15.42 |
| Duct/Semi/Brit | 5/0/0 | 0/0/5 | 0/4/1 | 1/0/0 | 0/0/1 | 4/0/2 | — |

TABLE III-continued

Evaluation of Glass Fibers in PC/ABS

| | H | I | J | 3 | 3' | K | L |
|---|---|---|---|---|---|---|---|
| Biaxial, −22 F., (ft-lb) | | | | | | | |
| Energy at Max Load | 42.4 | 2.93 | 2.1 | 2.11 | 2.55 | 1.91 | 1.79 |
| S. Dev. | 1.32 | 0.6 | 0.15 | 0.28 | 0.24 | 0.15 | 0.21 |
| Total Energy | 43.18 | 3.1 | 2.13 | 6.00 | 4.1 | 2.55 | 1.9 |
| Duct/Semi/Brit | 3 0 0 | 0 5 0 | 5 1 4 | 1 4 1 | 4 0 5 | | |

TABLE IV

Evaluation of Glass Fibers in PC/ABS

| | M | N | 4 | O | P |
|---|---|---|---|---|---|
| PC2 | 64 | 64 | 64 | 64 | 64 |
| SAN2 | 18 | 18 | 18 | 18 | 18 |
| ABS1 | 18 | 18 | 18 | 18 | 18 |
| GLASS | | | | | |
| GCB | 17.9 | — | — | — | — |
| GCA | — | 17.9 | — | — | — |
| GII | — | — | 17.9 | — | — |
| GCC | — | — | — | 17.9 | — |
| GCD | — | — | — | — | 17.9 |
| NI (0.125 in.) Impact (ft-lb/in) | | | | | |
| 73° F. | 2.6 | 2.0 | 4 | 2.3 | 2.6 |
| 20° F. | 1.6 | 1.5 | 2.4 | 1.6 | 1.6 |
| 40° | 1.6 | 1.6 | 1.7 | 1.6 | 1.6 |
| TS (psi) | 11112 | 11598 | 8348 | 11116 | 12686 |
| TM E5 (psi) | 5.86 | 6.63 | 6.49 | 6.5 | 6.78 |
| TE (%) | 3 | 2 | 5 | 2 | 3 |
| FS (psi) | 15460 | 16495 | 13125 | 15490 | 18610 |
| FM E5 (psi) | 5 | 6.2 | 6.3 | 6.3 | 6.5 |
| Biaxial, 72° F., (ft-lb) | | | | | |
| Energy at Max Load | 1.65 | 0.82 | 5.19 | 1.5 | 1.33 |
| S. Dev. | 0.06 | 0.1 | 0.64 | 0.11 | 0.07 |
| Total Energy | 13.94 | 13.41 | 16.13 | 14.22 | 14.47 |
| Duct/Semi/Brit | 1 4 0 | 5 3 2 | 0 5 0 | 5 | |
| Biaxial, −22 F., (ft-lb) | | | | | |
| Energy at Max Load | 1.3 | 0.79 | 1.43 | 0.92 | 1.22 |
| S. Dev. | 0.13 | 0.1 | 0.1 | 0.16 | 0.12 |
| Energy at Max Load | 3.88 | 11.27 | 5.79 | 10.85 | 4.64 |
| Duct/Semi/Brit | 0 4 1 | 4 1 4 | 0 5 0 | | |

TABLE IV-continued

| | Evaluation of Glass Fibers in PC/ABS | | | | |
|---|---|---|---|---|---|
| | M | N | 4 | O | P |
| 5 | | | | | |

TABLE V

| | Evaluation of Glass Fibers in PC/ABS | | | | |
|---|---|---|---|---|---|
| | Q | R | S | 5 | T |
| PC3 | 65 | 65 | 65 | 65 | 65 |
| SAN3 | 20 | 20 | 20 | 20 | 20 |
| ABS1 | 15 | 15 | 15 | 15 | 15 |
| GLASS | | | | | |
| GCB | — | 11.2 | — | — | — |
| GCA | — | — | 11.2 | — | — |
| GI1 | — | — | — | 11.2 | — |
| GCC | — | — | — | — | — |
| GCD | — | — | — | — | 11.2 |
| NI (0.125 in) Impact (ft-lb/in) | | | | | |
| 73° F. | 9.6 | 2.8 | 2 | 3.4 | 2.8 |
| −20° F. | 7.7 | 1.8 | 1.6 | 1.8 | 2 |
| −40 | 3.3 | 1.8 | 1.6 | 1.6 | 1.6 |
| TS (psi) | 8276 | 9962 | 10860 | 8584 | 11530 |
| TM E5 (psi) | 3.3 | 4.6 | 5.6 | 6 | 5.7 |
| TE % | 133 | 4 | 3 | 6 | 4 |
| FS(psi) | 12080 | 14550 | 15710 | 13305 | 16850 |
| FM E5 (psi) | 3.3 | 4.2 | 4.9 | 5.1 | 5.2 |
| Biaxial, 73 F., (ft-lb) | | | | | |
| Energy at Max Load | 38.1 | 6.08 | 1.39 | 6.71 | 1.96 |
| S. Dev. | 6.46 | 0.53 | 0.1 | 0.48 | 0.17 |
| Total Energy | 39.34 | 16.7 | 13.98 | 17.52 | 14.84 |
| Duct/SD/Brit | 5 0 0 3 2 0 5 5 0 1 4 | 0 0 0 0 0 | | | |
| Biaxial −22° F., (ft-lb) | | | | | |
| Energy at Max Load | 41.12 | 1.98 | 1.31 | 1.52 | 1.59 |
| S. Dev | 4.69 | 0.12 | 0.09 | 0.21 | 0.1 |
| Tot Eng | 42.6 | 9.34 | 11.75 | 11.88 | 13.09 |
| Du/SD/Br | 5 0 0 0 5 0 5 1 4 0 5 | 0 0 0 0 0 | | | |

TABLE VI

| | Evaluation of Glass Fibers in PC/ABS | | | |
|---|---|---|---|---|
| | U | 6 | V | W |
| PC3 | 65 | 65 | 65 | 65 |
| SAN3 | 20 | 20 | 20 | 20 |
| ABS1 | 15 | 15 | 15 | 15 |
| GLASS | | | | |
| GCB | 17.9 | — | — | — |
| GI1 | — | 17.9 | — | — |
| GCC | — | — | 17.9 | — |
| GCD | — | — | — | 17.9 |
| NI (0.125 in) Impact (ft-lb/in) | | | | |
| 73° F. | 2.4 | 3 | 1.6 | 2.4 |
| −20° F. | 1.6 | 1.7 | 1.6 | 1.6 |
| −40 | 1.5 | 1.6 | 1.6 | 1.6 |
| TS (psi) | 12636 | 8812 | 11712 | 13166 |
| TM E5 (psi) | 7.7 | 7.9 | 7.1 | 7.1 |

TABLE VI-continued

Evaluation of Glass Fibers in PC/ABS

| | U | 6 | V | W |
|---|---|---|---|---|
| TE % | 3 | 4 | 2 | 3 |
| FS(psi) | 18160 | 13895 | 16385 | 19490 |
| FM E5 (psi) | 6.3 | 6.4 | 6.9 | 6.3 |
| Biaxial Energy, 73, (ft-lb) | | | | |
| Energy at Max Load | 1.07 | 3.24 | 1.31 | 1.57 |
| S. Dev. | 0.16 | 0.95 | 0.21 | 0.18 |
| Total Energy Max Load | 14.15 | 13.54 | 13.68 | 14.83 |
| Duct/SD/Brit | 0 0 5 0 5 0 5 0 5 | | | |
| Biaxial −22° F., (ft-lb) | | | | |
| Energy at Max Load | 1.03 | 1.11 | 0.78 | 1.26 |
| S. Dev | 0.18 | 0.12 | 0.07 | 0.09 |
| Tot Eng | 11.35 | 13.92 | 13.96 | 13.11 |
| Du/SD/Br | 0 0 5 3 2 2 3 0 5 | | | |

TABLE VII

Evaluation of Glass Fibers in PC/ABS

| | X | Y | 7 | Z | 8 |
|---|---|---|---|---|---|
| PC1 | 64 | 64 | 64 | 64 | 64 |
| SAN2 | 18 | 18 | 18 | 18 | 18 |
| ABS1 | 18 | 18 | 18 | 18 | 18 |
| GLASS | | | | | |
| GCA | — | 11.2 | — | 17.9 | — |
| GI1 | — | — | 11.2 | — | 17.9 |
| NI (0.125 in) Impact, (ft-lb/in) | | | | | |
| 73° F. | 10.1 | 2.3 | 4.5 | 2.0 | 3.8 |
| −20° F. | 7.9 | 1.6 | 2.3 | 1.5 | 2.1 |
| −40° | 5.0 | 1.5 | 1.2 | 0.8 | 1.4 |
| TS (psi) | 7938 | 10496 | 8160 | 11776 | 8448 |
| TM E5 (psi) | 3.2 | 5.46 | 5.62 | 6.8 | 7.34 |
| TE % | 99.0 | 3 | 7 | 2.0 | 4.0 |
| FS (psi) | 11840 | 15340 | 12690 | 16680 | 13390 |
| FM E5 (psi) | 3.2 | 5.1 | 5.1 | 6.3 | 6.5 |
| Biaxial 72° F. | | | | | |
| Impact, (ft-lb) | | | | | |
| Energy at Max Load | 35.6 | 1.51 | 9.56 | 0.81 | 4.79 |
| S. Dev. | 2.66 | 0.13 | 1.06 | 0.003 | 1.69 |
| Total Energy | 36.68 | 13.03 | 18.68 | 12.78 | 15.05 |
| Duct/SD/Brit | 5 0 0 0 5 5 0 0 5 4 1 | 0 0 0 0 | | | |
| Biaxial, −22° F. | | | | | |
| Impact, (ft-lb) | | | | | |
| Energy at Max Load | 28.89 | 1.34 | 2.74 | 0.71 | 1.39 |
| S. Dev. | 3.27 | 0.09 | 0.26 | 0.05 | 0.19 |
| Total Energy | 32.77 | 10.64 | 13.65 | 12.5 | 13.4 |
| Du/SD/Br | 1 | | | | |

TABLE VII-continued

| Evaluation of Glass Fibers in PC/ABS |   |   |   |   |
| --- | --- | --- | --- | --- |
| X | Y | 7 | Z | 8 |
| 2 |   |   |   |   |
| 2 |   | 0 |   |   |
| 0 |   |   |   |   |
| 5 |   | 0 |   |   |
| 1 |   |   |   |   |
| 4 |   | 0 |   |   |
| 0 |   |   |   |   |
| 5 |   | 0 |   |   |
| 2 |   |   |   |   |
| 3 |   |   |   |   |

As is clear from the above examples, the compositions of the present invention exhibit improved properties over numerous other conventional fibers having various sizing agents thereon.

We claim:

1. A thermoplastic resin composition comprising:
   a) an aromatic polycarbonate resin present at a level of from 10 to 80 percent by weight based on the total weight of the composition, and
   b) a rubber modified vinyl aromatic-vinyl cyanide graft copolymer resin present at a level of from 10 to 80 percent by weight based on the total weight of the material, and
   c) glass fibers present at a level of from 5 to 50 percent by weight based on the total weight of the composition, said glass fibers having been treated with a coating agent comprising a polyolefin wax.

2. The composition of claim 1 wherein said aromatic polycarbonate resin is made by reacting bisphenol A with phosgene.

3. The composition of claim 2 wherein said rubber modified vinyl aromatic graft copolymer resin is a graft copolymer comprising a styrene-acrylonitrile polymeric graft portion and a butadiene rubber substrate.

4. The composition of claim 3 wherein said composition further comprises non-grafted styrene-acrylonitrile copolymer.

5. The composition of claim 4 wherein the non-grafted styrene-acrylonitrile copolymer has a styrene to acrylonitrile weight ratio of between 80:20 and 50:50.

6. The composition of claim 1 said aromatic polycarbonate resin is present at a level of from 40 to 75 percent by weight based on the total weight of the composition, said rubber modified graft copolymer is present at a level of from 20 to 50 percent by weight based on the total weight of the composition, said glass fibers being present at a level of from 10 to 20 percent by weight based on the total weight of the composition.

7. The composition of claim 1 consisting essentially of said aromatic polycarbonate resin, said rubber modified graft copolymer and said glass fibers.

8. The composition of claim 7 wherein said coating agent further comprises a functionalized silane.

9. The composition of claim 8 wherein said coating agent consists of said polyolefin wax and said functionalized silane.

10. A thermoplastic resin composition consisting essentially of:
    a) an aromatic polycarbonate resin present at a level of from 40 to 75 percent by weight based on the total weight of the composition, and
    b) a diene rubber modified vinyl aromatic-vinyl cyanide graft copolymer resin present at a level of from 20 to 50 percent by weight based on the total weight of the composition, and
    c) glass fibers present at a level of from 5 to 50 percent by weight based on the total weight of the composition, said glass fibers having been treated with a coating agent comprising a polyolefin wax.

11. The thermoplastic composition of claim 9 where said coating agent consists of a polyolefin wax and an amino alkoxy silane.

12. The composition of claim 1 wherein said coating agent comprises at least 50 weight percent polyolefin wax based on the total weight of the coating agent.

13. The composition of claim 1 wherein said coating agent is present in an amount of from 0.1 to 2.0 weight percent based on the total weight of said glass fibers.

14. The composition of claim 8 wherein said functionalized silane is selected from the group consisting of aminopropyl triethoxy silane, glycidyl propyl trimethoxy silane, (3,4-epoxycyclohexyl)ethyl triethoxy silane, mercaptopropyl alkoxy silane, aminoethyl aminopropyl alkoxy silane, and ureido-alkyl triethoxy silanes.

15. The composition of claim 1 wherein said polycarbonate is a branched polycarbonate.

16. The composition of claim 1 wherein the rubber modified vinyl aromatic vinyl cyanide graft copolymer is a graft copolymer of styrene and acrylonitrile on a butadiene rubber substrate.

17. The composition of claim 13 wherein said functional silane is aminopropyl triethoxy silane.

18. The composition of claim 16 wherein said polycarbonate is a branched polycarbonate.

19. A thermoplastic resin composition comprising:
    a) an aromatic polycarbonate resin present at a level of from 10 to 80 percent by weight based on the total weight of the composition, and
    b) a vinyl aromatic vinyl cyanide copolymer resin present at a level of from 10 to 80 percent by weight based on the total weight of the material, and
    c) glass fibers present at a level of from 5 to 50 percent by weight based on the total weight of the composition, said glass fibers having been treated with a coating agent comprising a polyolefin wax.

20. The composition of claim 19 wherein the composition further comprises a rubber modified copolymer.

* * * * *